W. T. NYHAN.
PIPE-COUPLING.
No. 183,465.
Patented Oct. 17, 1876.
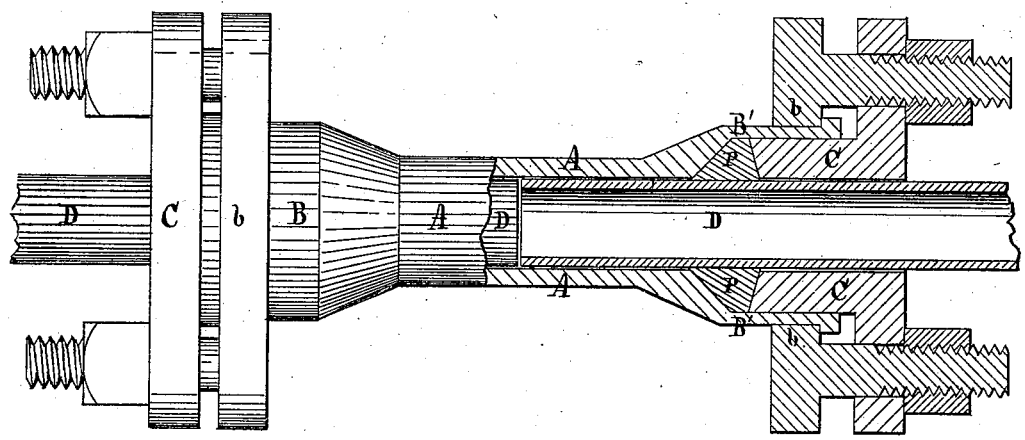
Witnesses.
G. B. Maynadier
J. E. Knox
Inventor.
William T. Nyhan by
Chas. F. Sleeper, Att'y.

UNITED STATES PATENT OFFICE.

WILLIAM T. NYHAN, OF BOSTON, MASSACHUSETTS.

IMPROVEMENT IN PIPE-COUPLINGS.

Specification forming part of Letters Patent No. 183,465, dated October 17, 1876; application filed October 21, 1875.

*To all whom it may concern:*

Be it known that I, WILLIAM T. NYHAN, of Boston, in the county of Suffolk and State of Massachusetts, have invented certain new and useful Improvements in Pipe-Couplings; and I do hereby declare that the following is a full, clear, and exact description of the same, reference being had to the accompanying drawings.

The object of my invention is to provide a cheap and efficient coupling for gas, water, and other pipes, which will possess advantages in the way of ready application and removal over all couplings now in use, and which will dispense with all screws, bells, or flanges, and with soldering upon the pipes to be coupled.

To accomplish this I make my coupling of two stuffing-boxes, connected by a pipe, A, which pipe I prefer to make larger in its inside diameter than the pipes to be coupled, so that it may be slid along on either pipe to couple or uncouple them. When the coupling is slid back upon the pipe D the other pipe is placed in position to be coupled, (the ends of these pipes may be finished or they may be roughly broken off, provided the fracture does not extend into the packing,) and the coupling is slid forward so as to cover the two ends. The screws connecting the glands C with the stuffing-boxes then compress the packing $p$, making a tight joint, and holding the pipes firmly together.

To remove a pipe, it is only necessary to loosen the packing and slide the coupling from each end of it onto the adjoining pipe, when the section may be removed. If the section thus removed should be fractured or broken off a new coupling might be placed over the facture or break, and the pipe restored to its former position.

I rely upon the packing to connect my stuffing-boxes with the pipes to be coupled, and upon nothing else. No screws or flanges are necessary on either pipe, and in this consists the principal point of my invention, for by it I am enabled to couple together pipes of unequal lengths, and with finished or jagged and broken ends, without the use of screws, lead, or solder upon the pipes, the only screws used being those which compress the packing.

This I believe to be new with me, not that I claim to be the first to apply a stuffing-box to a pipe to prevent a leakage at the joint, but that I am the first to couple pipes simply with stuffing-boxes, as above described.

I have shown the collar $b$ as loose upon the stuffing-box, and this may sometimes be desirable, in order to turn it around to get the screws into a more favorable position, but it is not essential.

I claim as my invention—

The pipe-coupling above described, consisting of the short pipe A, stuffing-boxes B B', and their glands C C', the coupling and pipes being connected together by the packing $p$, as described.

W. T. NYHAN.

Witnesses:
CHAS. F. SLEEPER,
WM. A. BENNINK.